US010146857B2

(12) United States Patent
Ghanea-Hercock et al.

(10) Patent No.: US 10,146,857 B2
(45) Date of Patent: Dec. 4, 2018

(54) SELECTION OF DATA SOURCES FOR SOFTWARE SERVICES

(71) Applicant: BRITISH TELECOMMUNICATIONS PUBLIC LIMITED COMPANY, London (GB)

(72) Inventors: Robert Alan Ghanea-Hercock, London (GB); Alexander Laurence Healing, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 200 days.

(21) Appl. No.: 15/036,596

(22) PCT Filed: Nov. 13, 2014

(86) PCT No.: PCT/GB2014/000467
§ 371 (c)(1),
(2) Date: May 13, 2016

(87) PCT Pub. No.: WO2015/071628
PCT Pub. Date: May 21, 2015

(65) Prior Publication Data
US 2016/0292261 A1  Oct. 6, 2016

(30) Foreign Application Priority Data

Nov. 15, 2013 (EP) .................................... 13250111

(51) Int. Cl.
*G06F 17/30* (2006.01)
*G06F 9/50* (2006.01)

(52) U.S. Cl.
CPC ...... *G06F 17/30657* (2013.01); *G06F 9/5077* (2013.01); *G06F 17/30705* (2013.01)

(58) Field of Classification Search
CPC .................... G06F 17/30705; G06F 17/30657
USPC ........................................................ 707/737
See application file for complete search history.

(56) References Cited

U.S. PATENT DOCUMENTS

| 8,161,076 B1* | 4/2012 | Jernigan, IV ....... H04L 67/1097 707/793 |
| 2007/0118844 A1* | 5/2007 | Huang .................... G06F 9/465 719/330 |
| 2013/0018854 A1* | 1/2013 | Condict ................ G06F 3/0608 707/692 |

OTHER PUBLICATIONS

Christos Doulkeridis et al., "Distributed Semanitc Overlay Networks"; Department of Informatics, Athens University of Economics and Business (AUEB); Department of Computer and Information Science, Norwegian University of Science and Technology (NTNU); and Athens University of Economics and Business, Department of Informatics; Oct. 2009 (32 pgs.).

(Continued)

*Primary Examiner* — Shahid A Alam
(74) *Attorney, Agent, or Firm* — Nixon & Vanderhye P.C.

(57) ABSTRACT

A data source software component generator apparatus for generating a representation of one or more data sources for selection from a plurality of data sources to satisfy a data dependency of a software service, each data source including a definition of at least one semantic identifier corresponding to data accessible via the data source, the data sources being represented organized into clusters of multiple data sources based on a semantic association between semantic identifiers of data sources in a cluster, each cluster being represented as one or more data structures, and the data dependency being defined by a specification including one or more semantic identifiers corresponding to data required for execution of the software service, the apparatus comprising: a data source encapsulator unit adapted to encapsulate each cluster as an executable software component; a semantic identifier selection unit adapted to select, from a set of semantic identifiers for all data sources represented in a cluster of a software component, a proper (Continued)

subset of the set of semantic identifiers based on at least one predetermined semantic identifier selection criterion; a software component configuration unit adapted to configure a software component to advertise semantic identifiers to components external to the software component, and provide an interface accessible by components external to the software component, the software component being adapted to deliver data from data sources in the cluster of the software component via the interface, such that, in operation, the apparatus generates and configures executable software components for selection of one or more software components to provide data for the software service based on the advertised semantic identifiers so as to satisfy at least part of the data dependency of the software service.

18 Claims, 4 Drawing Sheets

(56) References Cited

OTHER PUBLICATIONS

Arturo Crespo and Hector Garcia-Molina, "Semantic Overlay Networks for P2P Systems"; Google Technologies Inc., Stanford University; Proceedings of the 29$^{th}$ VLDB Conference, Berlin, Germany, 2003 (12 pgs.) and extended version (16 pgs.).
International Search Report for PCT/GB2014/000467, dated Jan. 27, 2015, 3 pages.

* cited by examiner

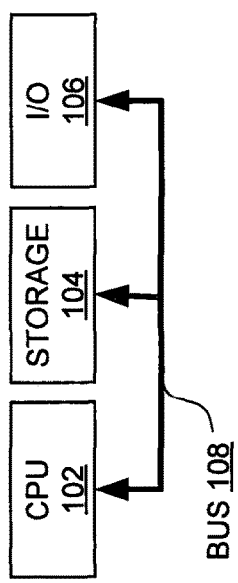
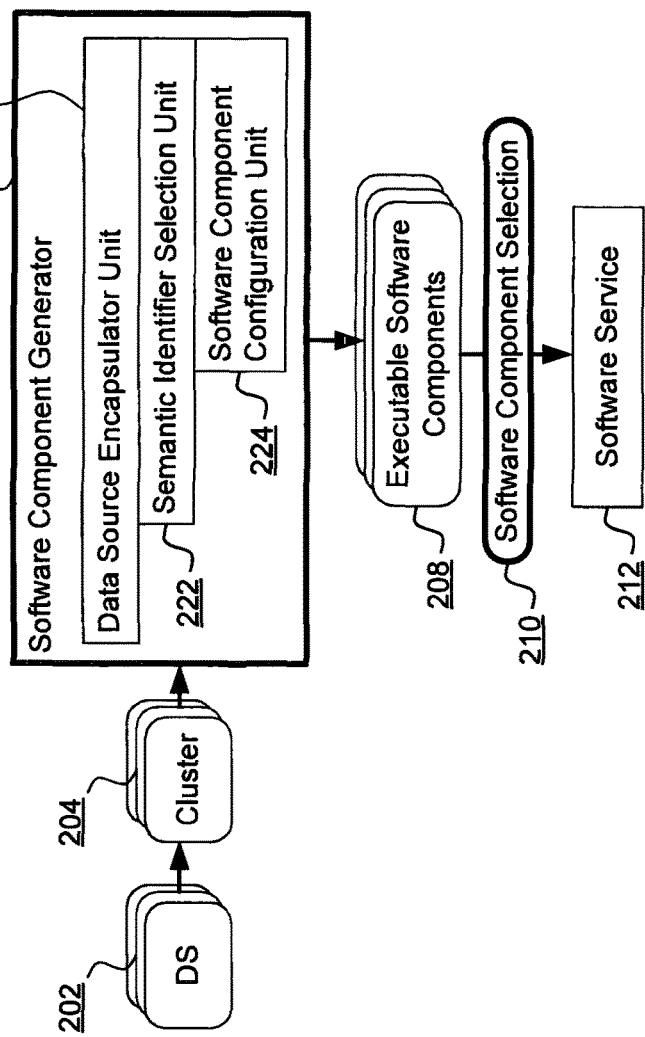

SELECTION OF DATA SOURCES FOR SOFTWARE SERVICES

This application is the U.S. national phase of International Application No. PCT/GB2014/000467 filed 13 Nov. 2014, which designated the U.S. and claims priority to EP Patent Application No. 13250111.5 filed 15 Nov. 2013, the entire contents of each of which are hereby incorporated by reference.

FIELD OF THE INVENTION

The present invention relates to selection of one or more data sources for a software service. In particular, the invention relates to the selection of clustered data sources encapsulated as executable software components.

BACKGROUND OF THE INVENTION

The growth of electronic data and media has created a significant engineering problem in terms of data search and analysis in order to extract useful knowledge or information from potentially large, disparate and distributed data sources. The generation of data including events, records, logs, indicators, audit information and sensor information is increasingly automated and pervasive in aspects of technical and societal infrastructure. A result of pervasive automated data generation is large quantities of complex data known as "big data".

Big data refers to sets of data, typically voluminous in nature, and of potentially high complexity in terms of either or all of the structure or format of data, distributed nature of the data, the interrelationships between data elements, or the disparity between data items, their structure and/or the mechanisms employed for their storage.

Big data presents particular challenges in the search, transfer, analysis, use and visualisation of data to meet specific needs without extraneous, irrelevant or missing data. Traditional data storage, search and analysis tools, such as relational or object-oriented databases, can be ineffective or inefficient due to the number, size and complexity of data stores and data items stored. The problems can be particularly acute in certain fields where the volume and complexity of data captured and stored can be high. Such fields include, inter alia: meteorology; genomics; connectomics; information technology networks; social networks and societal infrastructure including healthcare data, education data, energy and water supply data, public safety and policing data, traffic, transport and behavioural information. In particular, multiple data sources spanning numerous such fields present a considerable challenge in determining the meaning and usefulness of data sources for specific data processing, data analysis or data visualisation applications.

Existing approaches to data search and analysis depend on proactive search and selection of data items provided by data sources based on defined criteria. For example, web search technologies include data source indexing, data matching such as regular expression matching for data search, and search result ranking to provide a set of search results with a proposed order of relevance. Examples of such technology include regular expression search techniques such as the RE2 algorithm and information ranking such as the Pagerank algorithm, both of Google (Google and Pagerank are trademarks or registered trademarks of Google Inc.) While such an approach to data search can be effective for structured web page data, where each document is organised in accordance with a well-specified and conventional markup language having references, or links, between documents, the approach requires a comprehensive index of structured data sources and depends on result ranking techniques tied to the structure of the information, such as Pagerank which is dependent on references between web pages, to identify data relevance.

Thus web search techniques suffer from a dependency on stable data sources suitable for indexing, where the data sources conform to a known and readily parsable structure. Such approaches are not suitable for very large, complex, distributed and disparate data sources. Such approaches also do not provide for the integration of multiple large, complex and disparate data sources to satisfy a data dependency of a software service.

To address these challenges, Crespo et al. developed Semantic Overlay Networks (SONs) for searching peer-to-peer networks where data is distributed with no control over network structure or data source location ("Semantic Overlay Networks for P2P Systems", Crespo and Garcia-Molina, Proceedings of the $29^{th}$ VLDB Conference, Berlin, 2003). Nodes in a peer to peer network are assigned to one or more SONs based on the content of documents at each node. A SON manifests as a set of links between nodes, each link being a triple $(n_i, n_j, l)$ where $n_i$ and $n_j$ are connected nodes and l is a string. Traditional peer to peer networks are established by a single overlay network where l is constant. In contrast, a SON provides for multiple different l such that a node can be connected to a set of neighbours through an $l_1$ link, and to a potentially different set of neighbours through a $l_2$ link. A classification hierarchy of concepts is used to determine the links, l, between nodes. Documents stored at peer nodes in the network are classified into concepts in a hierarchy of concepts. The classification of documents determines the classification of nodes storing the documents. A search based on a query is conducted by classifying the query using the classification hierarchy to identify one or more SONs to which the query is directed. Nodes in each identified SON apply the query to documents. In this way, SONs provide for the searching of peers in a peer to peer network avoiding searching by peers that do not belong to a SON relevant to the query.

The approach of Crespo et al. has considerable disadvantages. While defining SONs for peers can improve search efficiency, the dependence on a predefined and common classification hierarchy can reduce search effectiveness. The classification hierarchy defines how nodes in a peer to peer network are linked, and is also the basis for identifying which nodes should be targeted for a classified query. Thus, to be effective, the classification hierarchy must reflect all possible nodes (and the documents stored at nodes) and all possible queries. Further, each SON is associated with a single concept in a classification hierarchy. Where a group of nodes share multiple concepts in common, multiple SONs are generated. Thus, using the approach of Crespo it is not possible to transfer from one SON to another SON unless classification of a query also identifies the other SON. This is particularly problematic by the requirement, in Crespo, that peers and queries are classified according to a classification hierarchy. Where a query is classified as a first concept in a branch of a classification hierarchy, and the query might also be somewhat relevant to a second concept in another, different branch of the hierarchy, such second concept will correspond to a separate SON and will not be searched despite the relevance to the query. Crespo requires precise classification of queries and peers to identify a peer for searching. Crespo only contemplates imprecise classification along a common branch of the classification hierarchy, which is tantamount to requiring precise classification of ancestor classifications, so restricting the extent of a search considerably to only precisely relevant classes or ancestor classes. Yet further, the approach of Crespo et al. requires a sharing of the classification hierarchy by all peers in the network. New peers are required to request, receive and store the classification hierarchy. Crespo is accordingly susceptible to multiple varying versions of a classification hierarchy leading to potentially ineffective search.

Thus there is a need to provide for the identification of appropriate data sources from a complex set data sources to satisfy a data dependency requirement of a software service without the above described disadvantages.

SUMMARY OF THE INVENTION

The present invention accordingly provides, in a first aspect, a computer implemented method for generating executable software components representing one or more data sources for selection from a plurality of data sources to satisfy a data dependency of a software service, each data source including a definition of at least one semantic identifier corresponding to data accessible via the data source, the data sources being represented organised into clusters of multiple data sources based on a semantic association between semantic identifiers of data sources in a cluster, each cluster being represented as one or more data structures, the method comprising the steps of: encapsulating each cluster as an executable software component; and for each executable software component: a) selecting, from a set of semantic identifiers for all data sources represented in a cluster of the software component, a proper subset of the set of semantic identifiers based on at least one predetermined semantic identifier selection criterion; b) configuring the software component to advertise the proper subset of semantic identifiers to components external to the software component; and c) configuring the software component to provide an interface accessible by components external to the software component, the software component being adapted to deliver data from data sources in the cluster of the software component via the interface, such that, in use, one or more software components are selected to provide data for the software service based on the advertised semantic identifiers so as to satisfy at least part of the data dependency of the software service.

Preferably the software service includes a specification of the data dependency, the specification including one or more semantic identifiers corresponding to data required for execution of the software service, and each of the one or more selected software components advertise semantic identifiers having a degree of relevance to the data dependency specification meeting a threshold degree of relevance.

Preferably the one or more software components are selected by the steps of: i) receiving, by one or more receiving executable software components, the data dependency specification; ii) determining, by each of the receiving executable software components, that a degree of relevance, to the data dependency specification, of semantic identifiers advertised by the receiving executable software component, meets the threshold degree of relevance; and iii) selecting executable software components depending on the determining step.

Preferably the receiving executable software components include substantially all the executable software components.

Preferably executable software components being determined to be related to other executable software components include a reference to the other software components so as to form a network of related executable software components, and the determination that software components are related is based on a determination that a degree of relevance of semantic identifiers between software components exceeds a threshold relational degree of relevance.

Preferably the receiving executable software components are determined to be a subset of all the executable software components, the subset being selected by at least one predetermined software component selection criterion, and wherein the method further comprises the repeating of at least steps i) and ii) for each executable software component referenced by a receiving executable software component iteratively so as to traverse a network of related executable software components.

Preferably the degree of relevance for a software component is determined using a comparison algorithm for comparing the data dependency specification and the semantic identifiers advertised by the software component.

Preferably the comparison algorithm for a software component is encapsulated with the software component as a function of the software component.

Preferably the threshold degree of relevance for a software component is encapsulated with the software component as a data element of the software component.

Preferably the threshold degree of relevance is defined, at least in part, in terms of a proportion of semantic identifiers advertised by a software component being determined to be semantically associated with one or more semantic identifiers of the data dependency specification.

Preferably the selected semantic identifiers are associated with concepts in an ontology, the method further comprising, for each of one or more of the executable software components: identifying one or more concepts in the ontology having at least one associated semantic identifier as an antonym of a selected semantic identifier; selecting the antonym for association with the executable software component as a negative semantic identifier for the executable software component, such that, in use, a software component having associated a negative semantic identifier having a degree of relevance to the data dependency specification meeting a threshold degree of relevance is inhibited in its selection as a selected software component for satisfying at least part of the data dependency.

Preferably the semantic identifier selection criterion is defined to select a semantically representative subset of semantic identifiers for all data sources represented by the cluster.

The present invention accordingly provides, in a second aspect, a data source software component generator apparatus for generating a representation of one or more data sources for selection from a plurality of data sources to satisfy a data dependency of a software service, each data source including a definition of at least one semantic identifier corresponding to data accessible via the data source, the data sources being represented organised into clusters of multiple data sources based on a semantic association between semantic identifiers of data sources in a cluster, each cluster being represented as one or more data structures, and the data dependency being defined by a specification including one or more semantic identifiers corresponding to data required for execution of the software service, the apparatus comprising: a data source encapsulator unit adapted to encapsulate each cluster as an executable software component; a semantic identifier selection unit adapted to select, from a set of semantic identifiers for all data sources represented in a cluster of a software component, a proper subset of the set of semantic identifiers based on at least one predetermined semantic identifier selection criterion; a software component configuration unit adapted to configure a software component to advertise semantic identifiers to components external to the software component, and provide an interface accessible by components external to the software component, the software component being adapted to deliver data from data sources in the cluster of the software component via the interface, such that, in operation, the apparatus generates and configures executable software components for selection of one or more software components to provide data for the software service based on the advertised semantic identifiers so as to satisfy at least part of the data dependency of the software service.

The present invention accordingly provides, in a third aspect, a computer program element comprising computer program code to, when loaded into a computer system and executed thereon, cause the computer to perform the steps of the method set out above.

Thus a cluster of data sources is encapsulated as an executable software component advertising semantic identifiers and having an interface through which data can be delivered. The encapsulation as an executable software component serves to reduce the complexity of the cluster as observable externally to the software component, such as by other software components or the software service. The selection of a subset of semantic identifiers further contributes to the reduction in complexity by providing an effective compression of the semantics expressed on behalf of the data sources in the encapsulated cluster. In this way a selection of data sources to satisfy the data dependency of the software service is simplified to an identification of a software component based on advertised semantic identifiers. In one embodiment, a degree of relevance of the advertised semantic identifiers is determined based on semantic identifiers specified for the data dependency. For example, a measure of a degree of relevance of semantic identifiers for a software component to semantic identifiers for a data dependency can be evaluated and compared to a threshold degree of relevance. Meeting the threshold degree of relevance can serve to identify a software component as an appropriate data source for the software service.

Embodiments of the present invention do not depend on a common ontology or a common manner for determining if a software component should be selected to provide data for the software service. In contrast, the executable software components can encapsulate their own algorithms, methods, functions or routines for determining a degree of relevance to a data requirement. Additionally, executable software components can encapsulate a threshold degree of relevance in terms of the nature and extent of such a threshold.

A particularly advantageous aspect of the present invention resides in the distribution of the function or mechanism used to determine whether a data source is to be selected to satisfy the data dependency. This determination is made by executable software components encapsulating the data sources in clusters. It is a software component that determines any relevance of an encapsulated cluster of data sources to a data dependency specification, not the specification itself. There is no requirement to maintain and distribute a common ontology, although a common ontology can be employed. Individual software components can be adapted, changed or varied in respect of the mechanism they employ to reach a determination on their selection for providing data for a software service. Such adaptations, changes or variety of mechanisms are operable without affecting a data dependency specification. A software component can adapt any or all of: a threshold degree of relevance; a selection of semantic identifiers advertised for the software component; and the manner for selecting such semantic identifiers for advertising. All such adaptations can be driven by the executable software component based on, for example: changes to a cluster of data sources; the data sources themselves; or data provided via the data sources. Such adaptations do not affect a data dependency specification but can affect the response by a software component to the specification. Thus there is a decentralisation of the data source selection to the data sources by way of the software components encapsulating the clusters of data sources.

Yet further, the present invention provides for the manner of a software component to determine its relevance to a data dependency specification to be also applied to the generation of references between software components such that a first software component can generate a reference to a second software component based on advertised semantic identifiers of the second software component and a relationship determiner of the first software component. Thus, each software component can identify and record relationships to other software components to form a network of related software components through which a data dependency specification can propagate.

Additionally, an executable software component can identify one or more negative semantic identifiers that serve to inhibit selection of the software component, such as in response to a determination that the negative semantic identifiers are relevant to the data dependency specification. Inhibiting selection of the software component can include precluding selection of the software component. Thus the executable software components are operable not only to determine their own selection for satisfying a data dependency, but also for determining appropriate inhibition of such selection.

BRIEF DESCRIPTION OF THE DRAWINGS

A preferred embodiment of the present invention will now be described, by way of example only, with reference to the accompanying drawings, in which:

FIG. 1 is a block diagram of a computer system suitable for the operation of embodiments of the present invention;

FIG. 2 is a schematic diagram of a data source software component generator for generating a representation of one or more data sources for selection to satisfy a data dependency of a software service in accordance with a preferred embodiment of the present invention;

DETAILED DESCRIPTION OF THE PREFERRED EMBODIMENTS

Figure 3:
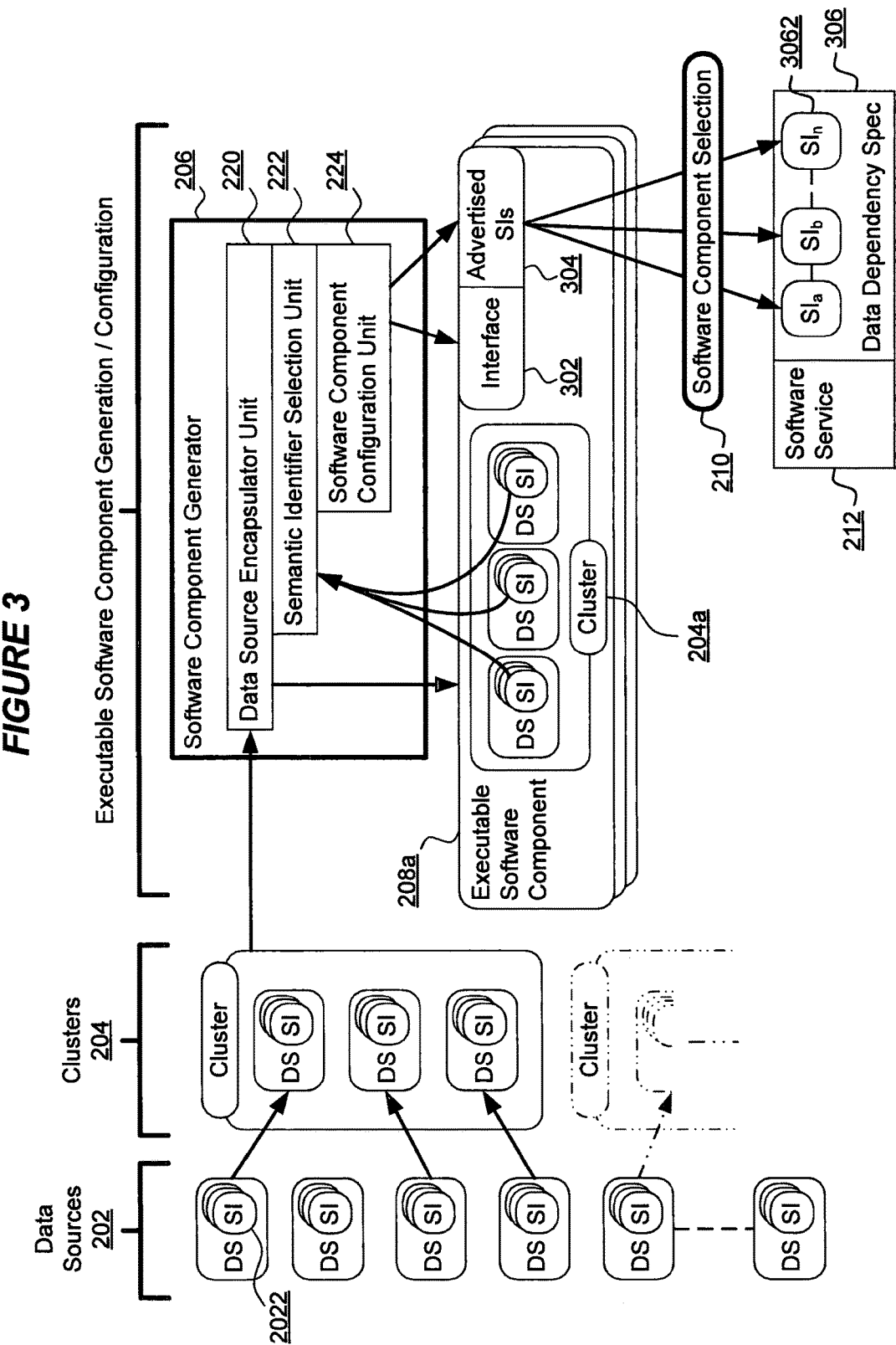
FIG. 3 is a detailed schematic diagram of an exemplary data source software component generator in accordance with an embodiment of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

FIG. 2 is a schematic diagram of a data source software component generator 206 for generating a representation of one or more data sources 202 for selection to satisfy a data dependency of a software service 212 in accordance with a preferred embodiment of the present invention. Software service 212 is a software assembly, object, function, method or other software component for constituting all or part of a software application. The software service 212 includes has a data dependency such as a data requirement, for its operation. Such a data dependency can be a mandatory dependency such that the software service 212 cannot function without data satisfying the data dependency. Alternatively, the data dependency can relate to one or more preferred data requirements, some or all of which are preferable and may not be mandatory. The software service 212 is adapted, configured and/or operable to receive data from one or more data sources 202, data clusters 204 or other data providing elements in satisfaction of the data dependency. Data can be received by the software service 212 via an interface of the software service 212 such as an application programming interface. Alternatively, data can be received by the software service 212 via an communications mechanism such as a process, inter-process, network, socket, datagram, wired or wireless or other suitable communications mechanism as will be apparent to those skilled in the art. Depending on the nature of data required by the software service 212, data may be received as a stream, such as a real-time, intermittent, periodic, clustered or batched stream of data elements. For example, data can include a Rich Site Summary (RSS) stream, feed or similar. Alternatively or additionally, data may be received in response to data requests based on a request/response protocol such that the software service 212 requests data from a data source, where data is provided by the data source in response to the request. Alternative techniques for providing data to the software service 212 in satisfaction of a data dependency of the software service 212 will be apparent to those skilled in the art.

In an example embodiment, the software service 212 is a software application, such as a web-based application, for providing sports news to a user in association with appropriate images. In such an example, the software application has a data dependency on sports news, and a data dependency on images. The software service 212 can be adapted to receive sports news by way of a streamed news feed, such as an RSS feed. Further, the software service 212 can be adapted to receive images from an image data source based on a request/response protocol whereby the service 212 requests an image of a particular type and a data source provides such image.

Satisfaction of the data dependency of the software service 212 is achieved by way of one or more data sources from a set of data sources 202. The data sources 202 are clustered into clusters 204 of multiple semantically related data sources using any suitable semantic clustering technique. For example, clustering of data sources can be achieved using one or more clustering algorithms such as: agglomerative or divisive hierarchical clustering algorithms; k-means algorithms; expectation-maximisation algorithms; and density-based clustering algorithms. Such semantic clustering is based on one or more attributes associated with each data source as semantic identifiers so as to provide a basis for cluster identification. The semantic identifiers can be explicitly defined for one or more of the data sources 202 such as metadata, attributes, parameters or characteristics of each data source. Alternatively or additionally, semantic identifiers can be inferred, determined, evaluated, calculated, assessed or measured for one or more of the data sources such as a measure of time, frequency, magnitude, volume, number of items, period, extent or other suitable characteristic of data sources. Additionally or alternatively, such measures can relate to data items, objects or elements accessible via one or more data sources such as measures of similarity, difference, average, or any other suitable characteristic of data times. Semantic identifiers can relate a data type, class or format of one or more fields in a data item. Semantic identifiers can relate to the content of data items accessible via a data source, such as a value of one or more fields in one or more data items.

In an example embodiment, semantic identifiers are explicitly defined for a data source as an extensible-markup language (XML) elements in an RSS feed, such as the title, link and description sub-elements of a channel element in an RSS document. In particular, the contents of the description sub-element can be used as a basis for a semantic clustering algorithm. Further, in an example embodiment, descriptions or column headings associated with columns in a table of a database data source can be used to infer semantic identifiers for a semantic clustering algorithm. Yet further, in an example embodiment, one or more sections in a markup-language definition of a web document can be used as semantic identifiers for a semantic clustering algorithm. Notably, despite the differing nature and format of each data source in the above described exemplary data sources, the extracted, derived or inferred semantic identifiers are applicable to common semantic clustering mechanisms such that potentially disparate and distributed data sources can be clustered to generate the set of clusters 204.

Each cluster 204 is a data structure representation of a subset of the data sources 202 determined to belong to the cluster 204. The representation can include a unique identification of the cluster and references to data sources belonging to the cluster 204. References can include an address, identifier, logical pointer, indicator, or other suitable mechanism for identifying a data source belonging to the cluster 204.

Embodiments of the present invention provide for the generation of a representation of data sources 202 for selection of data sources from the plurality of data sources 202 to satisfy the data dependency of the software service 212. Embodiments include a software component generator 206 as a software or hardware component operable to generate one or more executable software components 208. The software component generator 206 includes a data source encapsulator unit 220 as a software or hardware component for encapsulating each cluster 204 as an executable software component 208. The encapsulation, by the encapsulator unit 220, can be achieved by logically wrapping one or more data structures representing a cluster 204 in an executable software component such as a software object, software module, routine or function. For example, cluster data structures can be included as data elements or attributes of a software object definition such as an instantiation of a predefined class of objects including a specific cluster 204. Each resulting executable software component 208 corresponds to a cluster 204 and serves to reduce the complexity of the cluster 204 as observable externally, such as by other software components 208 or the software service 212.

The executable software components 208 are functional components in that they include executable functionality. In particular, each executable software component 208 includes functionality for providing or delivering data from data sources in a cluster 204 for the software component 208 to components external to the software component 208. For example, data from an RSS data source included in a cluster 204 is accessible via an interface of an executable software component 208 encapsulating the cluster 204. Such interface can be functional, such as a method, function or routine of the executable software component 208. Alternatively, the interface can provide information such as a reference, address or link to a data source 202 for providing data, the provision of such information constituting the delivery of data from data sources in the cluster of the executable software component 208.

The executable software components 208 can be linked to other software components to be comprised as part of a software solution or service. Such linking can be static or dynamic linking or linking by aggregation such as by inclusion of a software object as part of another software object or component. In particular, some or all of the executable software components 208 can be linked to the software service 212 such that a software component 208 can deliver data from data sources 202 in a cluster 204 of the software component 208 via an interface of the software component 208. The delivery of data in this way serves to satisfy at least part of the data dependency of the software service 212.

The software component generator 206 further includes a semantic identifier selection unit 222 as a software or hardware component for selecting semantic identifiers for an executable software component 208. The semantic identifiers are selected as a proper subset of all semantic identifiers for all data sources comprised in a cluster 204 based on one or more semantic identifier selection criteria. In a preferred embodiment, the semantic identifier selection criteria are determined so that the semantic identifier selection unit 222 selects a semantically representative proper subset of semantic identifiers for all data sources represented by a cluster 204. For example, a semantically representative subset of semantic identifiers can be selected based on a ranking algorithm of semantic identifiers, such as by ranking semantic identifiers based on frequency. Alternatively, semantic identifiers can be compared for similarity, such as: semantic similarity; synonyms; semantic similarity of antonyms of semantic identifiers; structural similarity such as a partial similarity in the expression of semantic identifiers—including as prefix, suffix, root or morpheme similarity or identity; and/or a cosine similarity metric of the similarity of semantic identifiers, any or all such approaches being combined with frequency analysis. The set of semantic identifiers selected by the selection unit 222 provides a reduction in complexity of a cluster 204 of data sources by providing an effective compression of semantics expressed on behalf of the data sources by an executable software component 208. The reduction in complexity arises since the set of all semantic identifiers for all data sources in a cluster 204 is reduced to a smaller, preferably representative set of semantic identifiers. This provides a technical contribution of embodiments of the present invention that the selection of data sources to satisfy a data dependency of the software service 212 is simplified to an identification of an executable software component based on a reduced set of semantic identifiers.

The software component generator 206 further includes a software component configuration unit 224 as a hardware or software component for configuring each of the executable software components 208 generated by the software component generator 206. The software component generator 206 configures an executable software component 208 to advertise the semantic identifiers selected, for the software component 208, by the semantic identifier selection unit 222. Advertising semantic identifiers means that the semantic identifiers are expressed by a software component 208 in a way that is accessible, visible, discernible or observable externally to the software component 208 such as by other, external, software components 208 or the software service 212. For example, semantic identifiers can be advertised by being delivered via a public interface or API of a software component 208, such as in response to an invocation of a public method or function of the software component 208. Alternatively, a software component 208 can include an externally accessible data element such as a list data structure, array, textual data element or other suitable data element including a representation of the advertised semantic identifiers. In a further alternative, semantic identifiers can be streamed, communicated, transmitted or emitted periodically, continuously or on request by a software component 208 via, for example, a network or programmatic interface connection. In yet a further alternative, the semantic identifiers can be stored in association with a software component 208, such as in or via a reference, library, database, register or table of software components 208, such that semantic identifiers for a software component 208 can be identified by reference to a particular semantic identifier (or similar semantic identifiers) or such that semantic identifiers can be identified by reference to a particular software component.

The software component configuration unit 224 is further adapted to configure each of the executable software components 208 to provide the interface for the delivery of data from data sources in the cluster associated with each software component 208. It will be appreciated by those skilled in the art that such an interface can be inherent in the generation or deployment of an executable software component 208, such as by inclusion of public interface methods, public functions, exposed subroutines and the like during the generation of the executable software components 208 such as during the encapsulation by the encapsulator 220.

While the software generator 206 has been illustrated and described as being comprised of three distinct and discrete units 220, 222 and 224, it will be appreciated by those skilled in the art that any or all of the functions and facilities of the software component generator 206, the data source encapsulator unit 220, the semantic identifier selection unit 222 and the software component configuration unit 224 can be combined or further subdivided such that any or all of the functions and facilities can be provided by different or common components or units in a centralised or distributed manner. Further, the order of operation of the units and components of the software component generator 206 is not limiting and any other suitable order of operation can be employed.

Thus, in use, the preferred embodiment of FIG. 1 is operable to generate executable software components 208 representing clusters of data sources such that data sources are selectable from the plurality of data sources 202 to satisfy a data dependency of a software service 212. A software component selection process 210 is thus operable with the executable software components 208 and the software service 212 to identify software components 208 suitable for satisfying the data dependency of the software service 212 based on semantic identifiers advertised by the software components 208. Preferably the software service 212 includes a specification of the data dependency including one or more semantic identifiers corresponding to data required for execution of the software service 212. Accordingly, the software component selection process 210 is simplified by the provision of the executable software components 208 such that the reduction in complexity of the data sources, by encapsulation as clusters in executable software components 208 advertising a proper subset of selected semantic identifiers, provides for a more efficient identification of executable software components 208 suitable for satisfying at least part of the data dependency of the software service 212.

FIG. 3 is a detailed schematic diagram of an exemplary data source software component generator 206 in accordance with an embodiment of the present invention. Many of the features of FIG. 3 are common to those described with respect to FIG. 2 and these will not be repeated here. FIG. 3 illustrates a set of data sources 202 where each data source includes one or more semantic identifiers 2022 as described hereinbefore. A clustering algorithm, process or technique, the details of which will be apparent to those skilled in the art and will not be described in detail here, defines clusters 204 of data sources based on semantic relationships between the data sources. The semantic relationships are preferably based on the semantic identifiers 2022 associated with data sources. The software component generator 206 is operable, by way of the data source encapsulator unit 220, the semantic identifier selection unit 222 and the software component configuration unit 224, to generate executable software components 208. Each executable software component encapsulates a cluster 204a. While FIG. 3 illustrates the cluster 204a being contained or comprised within an executable software component 208a, it will be apparent to those skilled in the art that the cluster 204a can alternatively be referenced, linked to, indicated or otherwise associated with the executable software component 208a such that a reference, indication, link or association is encapsulated within the software component 208a to effectively constitute encapsulation of the cluster 204a by the software component 208a. The executable software component 208a further includes an interface 302 via which the software component 208a delivers data from one or more of the data sources in the encapsulated cluster 204a. The executable software component 208a further includes one or more advertised semantic identifiers 304 as a proper subset of selected semantic identifiers for all data sources included in the encapsulated cluster 204a as hereinbefore described.

FIG. 3 further illustrates a software service 212 including a data dependency specification 306 having a plurality of semantic identifiers 3062. While a plurality of semantic identifiers 3062 are illustrated in the data dependency specification 306 of FIG. 3 it will be appreciated that a single semantic identifier will suffice.

A process for satisfaction of the data dependency of the software service 212 will now be described to highlight the advantageous effects of the executable software components 208 generated in accordance with embodiments of the present invention. Each executable software component 208a has an externally visible interface 302 and advertised semantic identifiers 304 (i.e. readable, accessible or detectable by components external to the software component). Most preferably, each of the plurality of executable software components 208 is stored in a library or other repository of software components.

According to one embodiment of the present invention, the data dependency specification 306 is packaged as a data structure, message, element or other suitable data item or items identifying semantic identifiers 3062 required for satisfaction of the data dependency. The data dependency specification 306 is used to check the executable software components 208 to identify one or more executable software components 208 suitable for satisfying the data dependency based on the data dependency specification 306. For example, the data dependency specification 306 can be communicated as a data structure to all or a subset of the executable software components 208. A receiving software component 208a receives the data dependency specification 306 and determines a degree of relevance of advertised semantic identifiers 304 for the software component 208a to the semantic identifiers 3062 in the data dependency specification 306. Based on the determined degree of relevance, the executable software component 208a selects, nominates, or identifies itself as a software component suitable for satisfying at least part of the data dependency of the software service 212. Thus, most preferably, each software component 208a further encapsulates executable functionality for undertaking an assessment of the degree of relevance of the software component 208a to a received data dependency specification. Notably, such functionality need not be common to all executable software components 208 such that each software component 208a can include its own specific functionality. Alternatively, common functionality or a centralised relevance determination function can be provided where consistency in application of the assessment of a degree of relevance is desired or required.

The selection, by an executable software component 208a, of itself as a software component for satisfying all or part of a data dependency can be based on a comparison of semantic identifiers 3062 of the data dependency specification 306 and advertised semantic identifiers 304 of the software component 208a to determine a degree of relevance. Preferably, the degree of relevance is a quantification resulting from a relevance determination algorithm such as a semantic similarity algorithm, a similarity metric calculation algorithm, or any other suitable method for quantifying a degree of relevance of sets of semantic identifiers. A proportion of relevant, identical, similar or related (e.g. synonymous) semantic identifiers between the advertised semantic identifiers 304 and the data dependency specification 306 can also, or alternatively, be used to quantify a degree of relevance. The degree of relevance is preferably compared to a threshold degree of relevance, the threshold being predetermined to indicate when a level of relevance is sufficient to select an executable software component 208a to provide data to a software service 212 in satisfaction of a data dependency. Advantageously, the threshold degree of relevance is encapsulated with the executable software component 208a such that each software component can have its own threshold degree, though shared or common thresholds can also be used whether stored centrally or shared between the software components 208. Relevance determination methods, such as a semantic comparison algorithm, can operate with reference to a semantic dictionary, ontology or other library for indicating semantic relationships and/or differences between semantic identifiers. Alternatively, relevance determination methods can operate on the form of semantic identifiers identifying common or differing-prefixes, suffixes, roots etc. Any dictionary, ontology or library referenced by a semantic relevance determination method can be encapsulated by each software component 208, or can be common multiple or all software components 208. In a preferred embodiment, the threshold degree of relevance is adaptable at runtime in response to triggers, such as in response to feedback provided by a software service 212. Further, in one embodiment, the function, algorithm or method for determining a degree of relevance of sets of semantic identifiers is adaptable at runtime in response to such triggers. Adaptations can include: how semantic identifiers are selected from either or both the advertised semantic identifiers 304 and/or the data dependency specification for relevance assessment; how the degree of relevance is calculated; parameters for the degree of relevance calculation; and/or selection of a relevance determination algorithm from a set of one or more different algorithms provided for or encapsulated by the software component. For example, a software service 212 can indicate when data provided by an executable software component 208a is not suitable for satisfying a data dependency, or does not satisfy the data dependency to a sufficient extent, such that the executable software component 208a can elect to adjust its threshold degree of relevance or method for determining relevance to account for such feedback, such as by increasing a level of relevance required to meet the threshold. The encapsulation of the relevance determination function and/or the threshold degree of relevance with the executable software component 208a provides for a separation of concerns between the software service 212, the data dependency specification 306 and the data sources 202 represented by encapsulated clusters 204 as software components 208. Further, such encapsulation provides an abstraction for the software component selection process 210 and the software service 212 in respect of how the data dependency specification 306 is used to satisfy the data dependency of the software service 212. Yet further, the encapsulation provides for cluster-level specificity of the relevance determination function and the threshold degree of relevance such that different clusters, by way of different executable software components, have separate and potentially disparate relevance determination functions.

In one embodiment, on determination by one or more executable software components 208 that the software components are suitable for satisfying at least part of a data dependency of the software service 212, the software components identify themselves or are identified as selected software components for the software service 212. Such identification can be achieved by communication, messaging or centralised recording of the selection of the selected software components. Subsequently, the selected software components are operable to provide data to the software service 212 via the interface 302 such that the software service 212 receives data from the selected software components. Data can be provided by software components 208 to the software service 212 in one of a number of suitable ways, including in a synchronous and/or directed manner, or in an asynchronous manner. For example, the software service 212 can statically or dynamically link to the selected software components to receive data from the software components through the interface 302 as a programmatic interface, such as functions or data structures exported by, or accessible in, the selected software components. Alternatively, the software service 212 can communicate with selected software components 208 using a network, interprocess or API communication where the interface 302 is so adapted. Such communication can be synchronous or asynchronous. In one exemplary embodiment the software service 212 identifies itself by a reference, address or pointer provided to selected software components, such as through the data dependency specification 306, such that selected software components can communicate data the software service 212. In an alternative embodiment the selected software components identify themselves by a reference, address or pointer provided to the software service 212 such that the software service 212 can communicate with the selected software components for the receipt of data.

In one embodiment, executable software components 208 are compared based on advertised semantic identifiers 304 of software components 208 to identify software components being determined to be related. Such relationships can include: semantic similarity of advertised semantic identifiers 304; synonymous semantic identifiers 304; ontological similarity of advertised semantic identifiers 304, such as semantic identifiers being in a common branch of a hierarchical ontology or having common ancestor concepts in the ontology; similar advertised semantic identifiers 304 based on prefixes, roots or suffixes of the semantic identifiers; and quantifications of similarity of such as are described above for determining relevance of advertised semantic identifiers 304 to the data dependency specification 306. In a preferred embodiment, each of the executable software components 208 includes a relationship determiner component as a hardware or software component for determining if the software component is related to one or more other software components. Preferably, an executable software component 208a determined to be related to one or more other executable software components includes a reference to the other executable software components. In this way a network of related software components is formed. Most preferable the reference is encapsulated in the executable software component 208a such as a pointer, address or unique identifier of a related software component. Where related software components are identified, a data dependency specification 306 can traverse the network of related executable software components starting at an initial receiving software component 208a and being communicated, shared or otherwise provided to related software components based on references to related software components. Most preferably the traversal of a network of related executable software components is controlled such that no one executable software component 208a is traversed more than once (to prevent repeated traversal of the same software components where the network of software components contains a loop of references between software components). One or more initial receiving software components can be identified based on one or more criteria including: a software component that is determined to be most relevant to a data dependency specification 306; a local software component; an arbitrary software component such that, initially, all software components are targeted by the data dependency specification and the data dependency specification is routed based on identified relevant (selected) software components and references to other software components; or any other suitable mechanism for determining one or more initial receiving software component.

Figure 4:
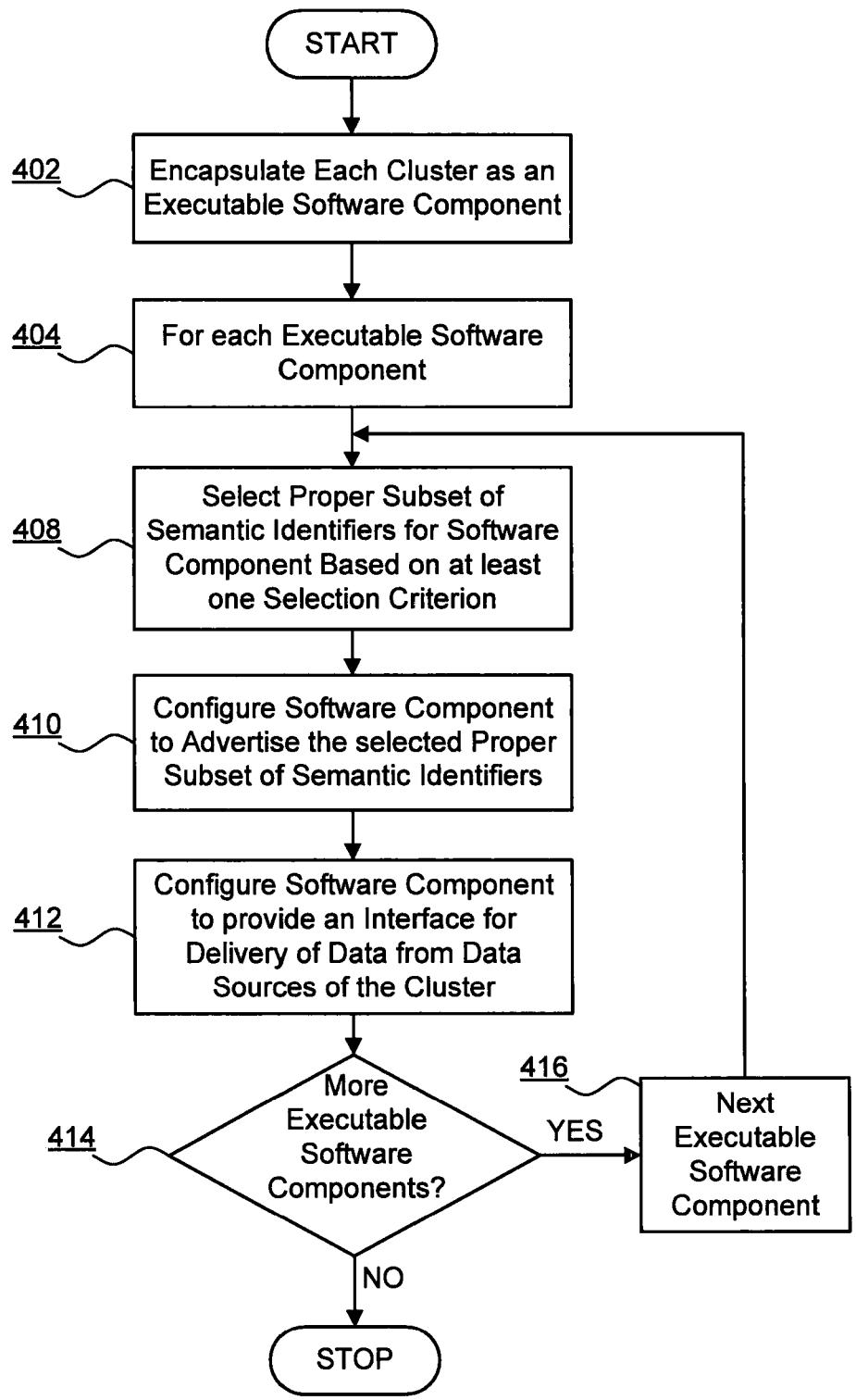
FIG. 4 is a flowchart of a method of the software component generator of FIG. 3 in accordance with an embodiment of the present invention.

FIG. 4 is a flowchart of a method of the software component generator 206 of FIG. 3 in accordance with an embodiment of the present invention. Initially, at step 402, the data source encapsulator unit 220 encapsulates each cluster 204 of data sources as an executable software component 208a. Step 404 initiates an iteration of steps 408 to 414 for each executable software component. At step 408 the semantic identifier selection unit 222 selects a proper subset of semantic identifiers for a current software component 208a based on at least one semantic identifier selection criterion as hereinbefore described. At step 410 the software component configuration unit 224 configures the current software component 208a to advertise the selected proper subset of semantic identifiers. At step 412 the software component configuration unit 224 configures the current software component 208a to provide an interface for the delivery of data from data sources of a cluster 204 encapsulated by the software component 208a. Subsequently the method checks for more executable software components 208 at step 414 and iterates steps 408 to 414 for a next software component at step 416.

Figure 5:
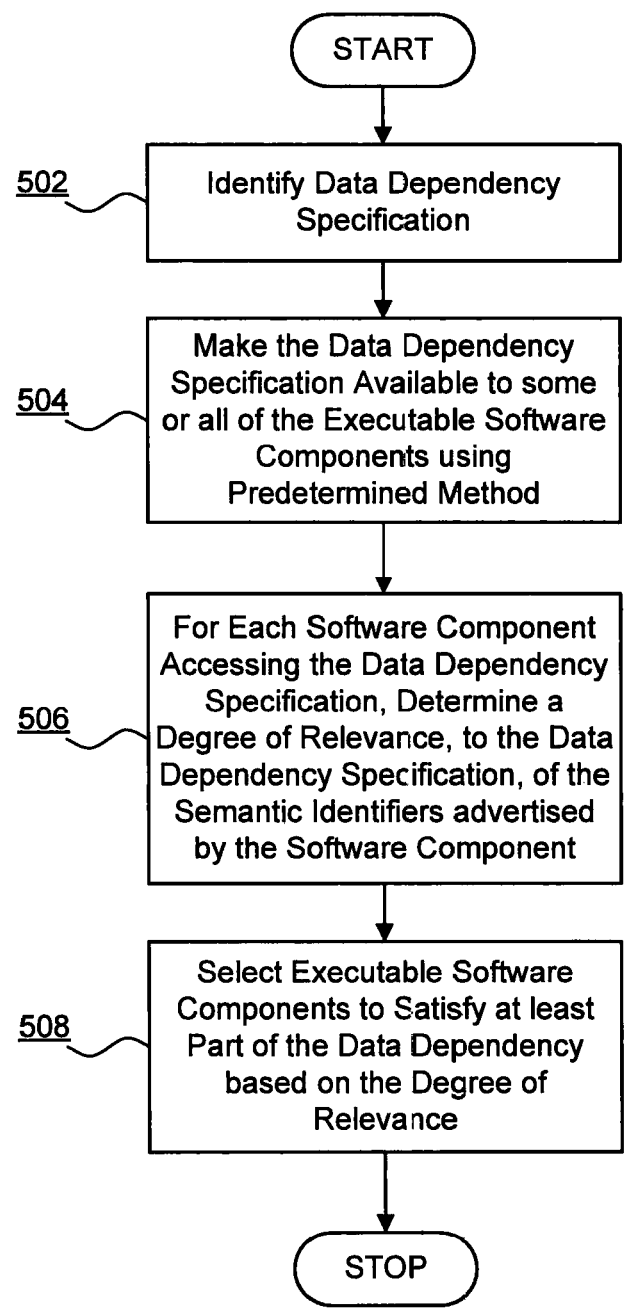
FIG. 5 is a flowchart of the software component selection process of FIG. 3 in accordance with an embodiment of the present invention.

FIG. 5 is a flowchart of the software component selection process 210 of FIG. 3 in accordance with an embodiment of the present invention. Initially, at step 502, the method identifies a data dependency specification 306 for a software service 212, the data dependency specification preferably including one or more semantic identifiers 3062 characterising a data dependency of the software service 212. At step 504 the data dependency specification 306 is provided to some or all of the executable software components 208 using a predetermined method. For example, in one embodiment, the data dependency specification 306 is communicated, transmitted or otherwise made available to all of the executable software components 208, or at least as many of the software components 208 as necessary until the data dependency of the software service 212 is determined to be satisfied or substantially satisfied, such as by being satisfied by selected software components 208 to a threshold extent. Alternatively, the data dependency specification 306 can be communicated to a selected one or subset of all executable software components 208, selected based on one or more criteria such as: a most semantically relevant one or subset of software components 208; most local software components 208, being software components sharing a geographical, logical, network, system or other locality all or part of the software service 212; most temporally relevant set of software components 208, such as software components 208 identified as generating data for a time period, timezone, timeframe, frequency or other temporal characteristic most compatible with, similar to or relevant to the software service 212; and/or highest ranked in a ranking of software components 208, such as a ranking based on the prevalence, experience, past relevance and/or feedback determined and/or provided by software services or users of software services, or ranking based on performance measurements, responsiveness, service level satisfaction measures or other performance, reliability, accessibility or serviceability measures. In a preferred embodiment, the method for making the data dependency specification 306 available to executable software components 208 includes the traversal of a graph of related software components such that the data dependency specification 306 is communicated to software components determined to be related to software components identified as being relevant to the data dependency specification 306.

Subsequently, at step 506, the method determines, for advertised semantic identifiers 304 of each software component 208a accessing the data dependency specification 306, a degree of relevance of the advertised semantic identifiers 30 to the data dependency specification 306. At step 508 executable software components 208 are selected to satisfy at least part of the data dependency based on a degree of relevance determined at step 506. In an exemplary embodiment, software components are selected where the degree of relevance exceeds a threshold degree as hereinbefore described.

Thus, in use, the advertised semantic identifiers 304 for executable software components 208 are used to determine a selected set of one or more software components for satisfying at least part of a data dependency of the software service 212. In one embodiment, further semantic identifiers can be determined for an executable software component as negative semantic identifiers for, in use, determining when a software component should be inhibited or precluded from providing data for the software service 212. Thus, semantic identifiers advertised by a software component 208a for measuring a positive degree of relevance of the software component 208a to a data dependency specification 306 can be further supplemented by negative semantic identifiers indicating a negative degree of relevance. For example, a software service having a data dependency relating to software agents crawling networks, such as automated agents or spiders, might include semantic identifiers representative of such data dependency, such as semantic identifiers "AGENT"; "SPIDER"; and "CRAWL". Such identifiers comprised within a data dependency specification 306 can be received or accessed by executable software components 208. A software component encapsulating a cluster of data sources relating to insects might have advertised semantic identifiers such as "CRAWLERS"; and "SPIDERS". With reference to such advertised semantic identifiers, such a data source might be determined to exhibit sufficient relevance to the data dependency specification 306 that the software component is selected to provide data to the software service 212, despite the software component encapsulating a cluster 204 of data sources being irrelevant to the satisfaction of the data dependency. In such an example, the use of a negative semantic identifier can inhibit or preclude the selection of certain software components. For example, a negative semantic identifier can be determined based on an advertised semantic identifier or other semantic identifiers associated with data sources in a cluster for a software component and not being selected for advertising by the software component. A negative semantic identifier can be determined as an antonym of an advertised or other semantic identifier for a software component. Alternatively, a negative semantic identifier can be determined using an ontology of concepts such that a semantic identifier having a singular expression, such as "SPIDER", and being categorised multiply in an ontology of concepts, such as classified as an "ARACHNID" and as a "SOFTWARE AGENT", is used to define a negative semantic identifier based on the less relevant, or irrelevant, ontological class ("SOFTWARE AGENT" in this case). Thus, a software component relating to insects can include advertised semantic identifiers "CRAWLERS"; and "SPIDERS" and negative semantic identifier "SOFTWARE AGENT". Thus, in use, a relevance determination method associated with, or encapsulated by, the software component determines relevance based on the advertised semantic identifiers tempered by the negative semantic identifiers such that relevance of negative semantic identifiers can inhibit or preclude selection of a software component. Precluding selection of a software component can be achieved by preventing the software component from being selected, or self-selecting, to provide data in satisfaction of a data dependency for a software service 212 if the relevance of the negative semantic identifier exceeds a threshold degree of relevance. Inhibition of selection of a software component can be achieved by, for example, negatively affecting a quantified measure of a degree of relevance of advertised semantic identifiers 304, such as by subtraction of a degree of relevance with a negative semantic identifier.

In a preferred embodiment, the advertised semantic identifiers 304 are determined by the semantic identifier selection unit 222 based on a representative proper subset of semantic identifiers from all semantic identifiers for all data sources in a cluster encapsulated as an executable software component 208. Preferably, the selection by the semantic identifier selection unit 222 is repeated, refreshed or modified based on changes to the set of all semantic identifiers for data sources in the encapsulated cluster. Such redetermination of the proper subset of semantic identifiers for advertising can be triggered, or prompted by a condition, such as a degree of change to the set of semantic identifiers for all data sources; or periodically based on an elapsed time. Further, semantic identifiers 2022 for each data source can be determined based on the data accessible via each data source, such as based on an analysis of the content or metadata associated with data accessible via a data source. The data source semantic identifiers can be redetermined based on changes to such data on a periodic or other, e.g. conditional, basis. Such redetermination can lead to a corresponding refresh of the semantic identifiers selected by the semantic identifier selection unit for advertising by a software component 208.

Thus, in accordance with embodiments of the present invention, a cluster 204 of data sources is encapsulated as an executable software component 208a advertising semantic identifiers 304 and having an interface 302 through which data can be delivered to satisfy a data dependency of a software service 212. The encapsulation as an executable software component 208a serves to reduce the complexity of the cluster 204 as observable externally to the software component 208a, such as by other software components 208 or the software service 212. The selection of a proper subset of semantic identifiers further contributes to the reduction in complexity by providing an effective compression of the semantics expressed on behalf of the data sources 202 in the encapsulated cluster. In this way, a selection of data sources to satisfy the data dependency of the software service 212 is simplified to an identification of an executable software component 208a based on advertised semantic identifiers 304. In one embodiment, a degree of relevance of the advertised semantic identifiers 304 is determined based on semantic identifiers specified for the data dependency. For example, a measure of a degree of relevance of semantic identifiers for a software component to semantic identifiers 3062 for a data dependency can be evaluated and compared to a threshold degree of relevance. Meeting the threshold degree of relevance can serve to identify a software component as an appropriate data source for the software service 212.

Embodiments of the present invention do not depend on a common ontology or a common manner for determining if a software component should be selected to provide data for the software service. In contrast, the executable software components 208 can encapsulate their own algorithms, methods, functions or routines for determining a degree of relevance to a data requirement. Additionally, executable software components 208 can encapsulate a threshold degree of relevance ii terms of the nature and extent of such a threshold.

A particularly advantageous aspect of the present invention resides in the distribution of the function or mechanism used to determine whether a data source is to be selected to satisfy the data dependency. This determination is made by executable software components 208 encapsulating the data sources in clusters 204. It is a software component 208a that determines any relevance of an encapsulated cluster of data sources to a data dependency specification, not the data dependency specification itself. There is no requirement to maintain and distribute a common ontology, although a common ontology can be employed. Individual executable software components 208a can be adapted, changed or varied in respect of the mechanism they employ to reach a determination on their selection for providing data for a software service 212. Such adaptations, changes or variety of mechanisms are operable without affecting a data dependency specification 306. A software component 208a can adapt any or all of: a threshold degree of relevance; a selection of semantic identifiers advertised for the software component 208a; and the manner for selecting such semantic identifiers for advertising. All such adaptations can be driven by the executable software component 208a based on, for example: changes to a cluster 204 of data sources; the data sources 202 themselves; or data provided via the data sources 202. Such adaptations do not affect a data dependency specification 306 but can affect the response by a software component 208a to the specification 306. Thus there is a decentralisation of the data source selection to the data sources 202 by way of the executable software components 208 encapsulating the clusters 204 of data sources 202.

Yet further, the present invention provides for the manner of a software component 208a to determine its relevance to a data dependency specification 306 to also be applied to the generation of references between software components 208 such that a first software component can generate a reference to a second software component based on advertised semantic identifiers 304 of the second software component and a relationship determiner of the first software component. Thus, each software component 208a can identify and record relationships to other software components to form a network of related software components through which a data dependency specification can propagate.

Additionally, an executable software component 208a can identify one or more negative semantic identifiers that serve to inhibit or preclude selection of the software component, such as in response to a determination that the negative semantic identifiers are relevant to the data dependency specification 306. Inhibiting selection of the software component 208a can include precluding selection of the software component. Thus the executable software components 208 are operable not only to determine their own selection for satisfying a data dependency, but also for determining appropriate inhibition of such selection.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for generating executable software components representing one or more data sources for selection from a plurality of data sources to satisfy a data dependency of a software service, each data source including a definition of at least one semantic identifier corresponding to data accessible via the data source, the data sources being represented organised into clusters of multiple data sources based on a semantic association between semantic identifiers of data sources in a cluster, each cluster being represented as one or more data structures, the method comprising the steps of:

encapsulating each cluster as an executable software component; and for each executable software component:
   a) selecting, from a set of semantic identifiers for all data sources represented in a cluster of the software component, a proper subset of the set of semantic identifiers based on at least one predetermined semantic identifier selection criterion;
   b) configuring the software component to advertise the proper subset of semantic identifiers to components external to the software component; and
   c) configuring the software component to provide an interface accessible by components external to the software component, the software component being adapted to deliver data from data sources in the cluster of the software component via the interface, such that, in use, one or more software components are selected to provide data for the software service based on the advertised semantic identifiers so as to satisfy at least part of the data dependency of the software service;

wherein the software service includes a specification of the data dependency, the specification including one or more semantic identifiers corresponding to data required for execution of the software service, and wherein each of the one or more selected software components advertise semantic identifiers having a degree of relevance to the data dependency specification meeting a threshold degree of relevance.

2. The method of claim 1 wherein the one or more software components are selected by the steps of:
   i) receiving, by one or more receiving executable software components, the data dependency specification;
   ii) determining, by each of the receiving executable software components, that a degree of relevance, to the data dependency specification, of semantic identifiers advertised by the receiving executable software component, meets the threshold degree of relevance; and
   iii) selecting executable software components depending on the determining step.

3. The method of claim 2 wherein the receiving executable software components include substantially all the executable software components.

4. The method of claim 2 wherein executable software components being determined to be related to other executable software components include a reference to the other software components so as to form a network of related executable software components,
   wherein the determination that software components are related is based on a determination that a degree of relevance of semantic identifiers between software components exceeds a threshold relational degree of relevance.

5. The method of claim 4 wherein the receiving executable software components are determined to be a subset of all the executable software components, the subset being selected by at least one predetermined software component selection criterion, and wherein the method further comprises the repeating of at least steps i) and ii) for each executable software component referenced by a receiving executable software component iteratively so as to traverse a network of related executable software components.

6. The method of claim 1 wherein the degree of relevance for a software component is determined using a comparison algorithm for comparing the data dependency specification and the semantic identifiers advertised by the software component.

7. The method of claim 6 wherein the comparison algorithm for a software component is encapsulated with the software component as a function of the software component.

8. The method of claim 1 wherein the threshold degree of relevance for a software component is encapsulated with the software component as a data element of the software component.

9. The method of claim 1 wherein the threshold degree of relevance is defined, at least in part, in terms of a proportion of semantic identifiers advertised by a software component being determined to be semantically associated with one or more semantic identifiers of the data dependency specification.

10. The method of claim 1 wherein the selected semantic identifiers are associated with concepts in an ontology, the method further comprising, for each of one or more of the executable software components:
    identifying one or more concepts in the ontology having at least one associated semantic identifier as an antonym of a selected semantic identifier;
    selecting the antonym for association with the executable software component as a negative semantic identifier for the executable software component,
    such that, in use, a software component having associated a negative semantic identifier having a degree of relevance to the data dependency specification meeting a threshold degree of relevance is inhibited in its selection as a selected software component for satisfying at least part of the data dependency.

11. A non-transitory computer-readable storage medium storing computer program code to, when loaded into a computer system and executed thereon, cause the computer to perform the steps of a method as claimed in claim 1.

12. A data source software component generator apparatus for generating a representation of one or more data sources for selection from a plurality of data sources to satisfy a data dependency of a software service, each data source including a definition of at least one semantic identifier corresponding to data accessible via the data source, the data sources being represented organised into clusters of multiple data sources based on a semantic association between semantic identifiers of data sources in a cluster, each cluster being represented as one or more data structures, and the data dependency being defined by a specification including one or more semantic identifiers corresponding to data required for execution of the software service, the apparatus comprising:
- a memory for storing instructions; and
- a computer processor for executing the instructions so that the apparatus is at least configured to:
  - encapsulate each cluster as an executable software component;
  - select, from a set of semantic identifiers for all data sources represented in a cluster of a software component, a proper subset of the set of semantic identifiers based on at least one predetermined semantic identifier selection criterion;
  - configure a software component to advertise semantic identifiers to components external to the software component, and provide an interface accessible by components external to the software component, the software component being adapted to deliver data from data sources in the cluster of the software component via the interface; and
  - generate and configure executable software components for selection of one or more software components to provide data for the software service based on the advertised semantic identifiers so as to satisfy at least part of the data dependency of the software service;
- wherein the software service includes a specification of the data dependency, the specification including one or more semantic identifiers corresponding to data required for execution of the software service; and
- wherein each of the one or more selected software components advertise semantic identifiers having a degree of relevance to the data dependency specification meeting a threshold degree of relevance.

13. The data source software component generator apparatus of claim 12 wherein the apparatus is further configured to select one or more software components by:

i) receiving, by one or more receiving executable software components, the data dependency specification;
ii) determining, by each of the receiving executable software components, that a degree of relevance, to the data dependency specification, of semantic identifiers advertised by the receiving executable software component, meets the threshold degree of relevance; and
iii) selecting executable software components depending on the determining step.

14. The data source software component generator apparatus of claim 12 wherein the degree of relevance for a software component is determined using a comparison algorithm for comparing the data dependency specification and the semantic identifiers advertised by the software component.

15. The data source software component generator apparatus of claim 12 wherein the threshold degree of relevance for a software component is encapsulated with the software component as a data element of the software component.

16. The data source software component generator apparatus of claim 12 wherein the threshold degree of relevance is defined, at least in part, in terms of a proportion of semantic identifiers advertised by a software component being determined to be semantically associated with one or more semantic identifiers of the data dependency specification.

17. The data source software component generator apparatus of claim 12 wherein the selected semantic identifiers are associated with concepts in an ontology, the apparatus is further configured, for each of one or more of the executable software components, to:
- identify one or more concepts in the ontology having at least one associated semantic identifier as an antonym of a selected semantic identifier;
- select the antonym for association with the executable software component as a negative semantic identifier for the executable software component,
- such that, in use, a software component having associated a negative semantic identifier having a degree of relevance to the data dependency specification meeting a threshold degree of relevance is inhibited in its selection as a selected software component for satisfying at least part of the data dependency.

18. The data source software component generator apparatus of claim 12 wherein the semantic identifier selection criterion is defined to select a semantically representative subset of semantic identifiers for all data sources represented by the cluster.

* * * * *